(12) United States Patent
Steidl et al.

(10) Patent No.: US 6,413,068 B1
(45) Date of Patent: Jul. 2, 2002

(54) TIRE MOLD HEAT TRANSFER SYSTEM

(75) Inventors: Larry Eugene Steidl, Akron; James Anthony Bukowski, Doylestown; George Michael Stoila, Tallmadge, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/613,602

(22) Filed: Jul. 10, 2000

(51) Int. Cl.[7] .............................................. B29C 35/02
(52) U.S. Cl. ...................................................... 425/40
(58) Field of Search ...................... 425/40, 46

(56) References Cited

U.S. PATENT DOCUMENTS

| | | | |
|---|---|---|---|
| 2,046,372 A | 7/1936 | Engstrom | |
| 3,058,157 A | 10/1962 | Breiner | |
| 4,116,595 A | 9/1978 | Fike et al. | 425/17 |
| 4,338,068 A | * 7/1982 | Suh et al. | 425/144 |
| 4,638,854 A | * 1/1987 | Noren | 425/DIG. 110 |
| 5,173,308 A | 12/1992 | Scantland et al. | 425/40 |
| 5,186,951 A | 2/1993 | Siegenthaler | 425/28.1 |
| 5,320,510 A | 6/1994 | Siegenthaler | 425/28.1 |
| 5,391,337 A | * 2/1995 | Kearney et al. | 264/327 |
| 5,437,547 A | 8/1995 | Holton et al. | 425/548 |
| 5,599,565 A | 2/1997 | Dittlo | 425/384 |
| 5,762,972 A | * 6/1998 | Byon | 425/144 |
| 5,971,742 A | 10/1999 | McCollum et al. | 425/542 |
| 6,168,740 B1 | * 1/2001 | Koch et al. | 425/548 |

FOREIGN PATENT DOCUMENTS

| | | | |
|---|---|---|---|
| JP | 60-64819 | * | 4/1985 |
| JP | 60-23082 | * | 11/1985 |
| JP | 62-214908 | * | 9/1987 |
| JP | 62-225310 | * | 10/1987 |
| JP | 6-143289 | * | 5/1994 |
| JP | 6-246751 | * | 9/1994 |
| JP | 99-320567 | | 11/1999 |

OTHER PUBLICATIONS

"Unidentified" article regarding Richard S. Gaugler and George M. Grover, Development of Heat Pipes, pp. 1–7, Undated.
Article regarding NASA Tech Brief on Jet Propulsion Laboratoty, dated May 1971.

* cited by examiner

Primary Examiner—James P. Mackey
(74) Attorney, Agent, or Firm—Frederick K. Lacher, Esq.; Bruce L. Hendricks, Esq.

(57) ABSTRACT

A tire mold heat transfer system in which heat pipes are enclosed in tubular passages in the tire mold to transfer heat to heated positions adjacent the tread and sidewall forming sections of the mold.

9 Claims, 8 Drawing Sheets

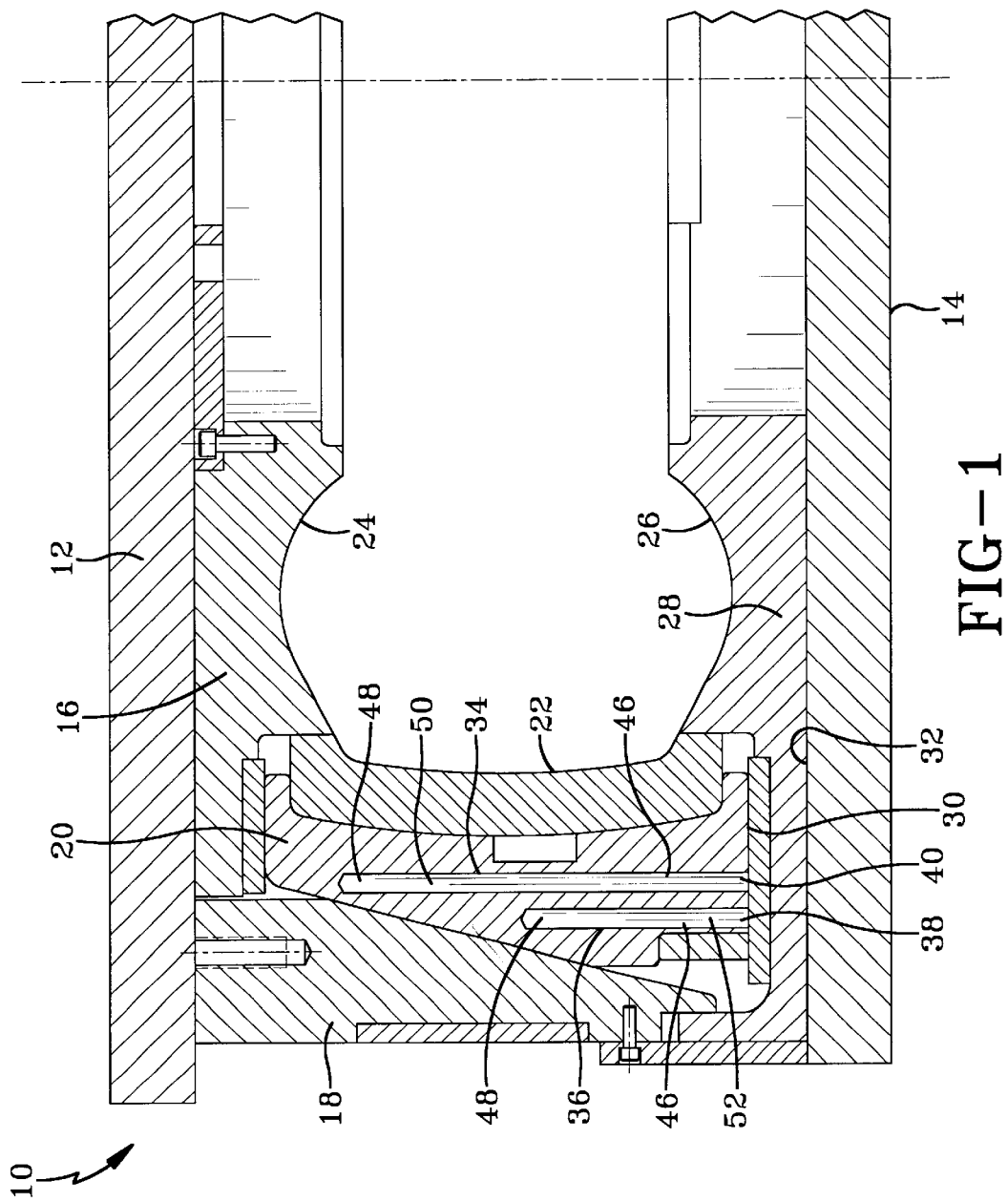

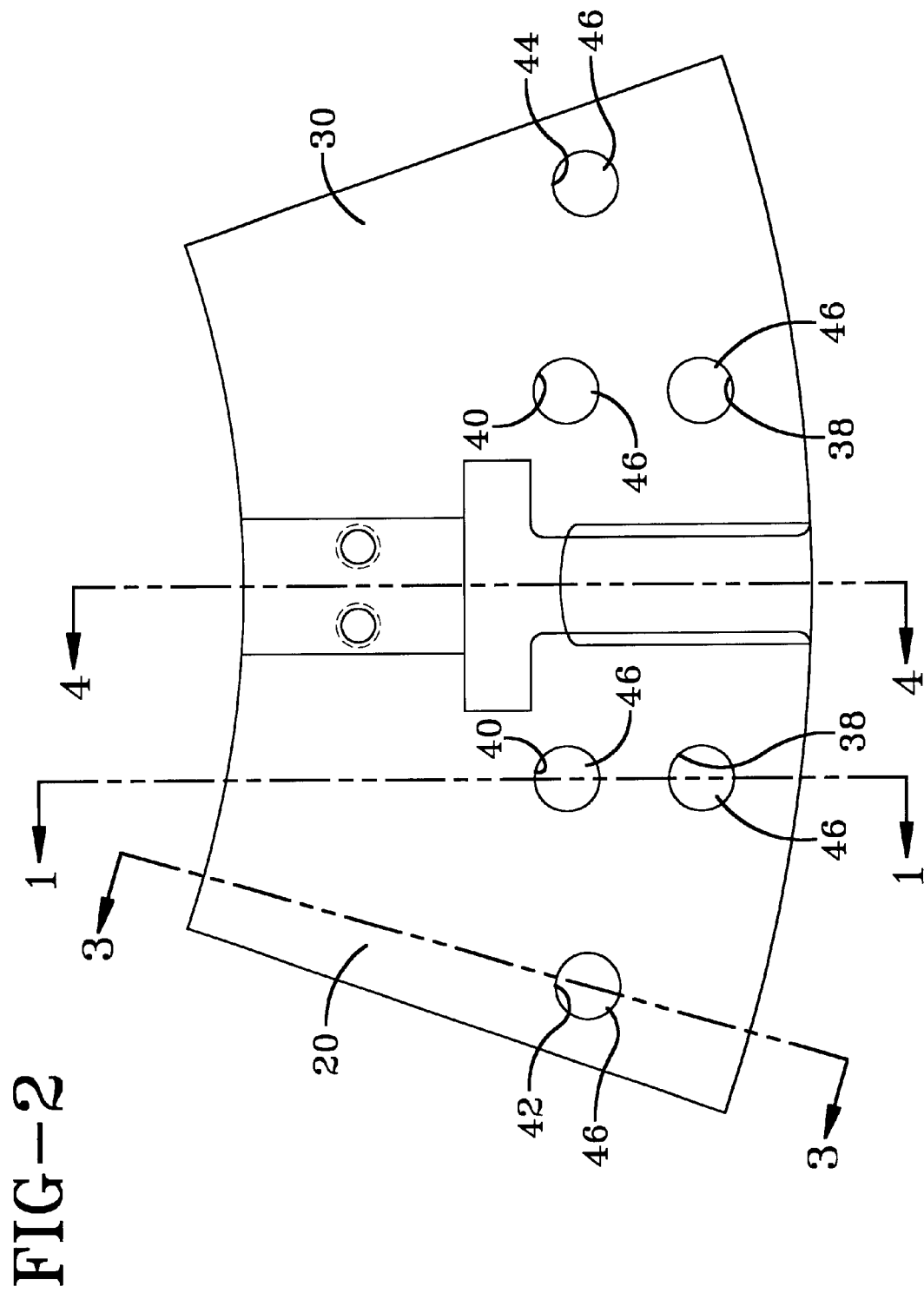

TIRE MOLD HEAT TRANSFER SYSTEM

TECHNICAL FIELD

This invention relates to tire molds and especially to tire molds having heat pipes incorporated for providing improved heating of the tread and sidewall forming surfaces.

BACKGROUND OF THE INVENTION

Tire molds of steel or aluminum have been heated by steam heated platens or by placing the molds in steam domes. Thermal conduction through steel or aluminum has been relied upon to transfer heat to the tread and sidewall forming surfaces. Also, the cure time has been extended by the temperature recovery time following a loading or unloading cycle. Problems have also been encountered in providing temperature uniformity at positions on the mold-tire interfaces.

SUMMARY OF THE INVENTION

The present invention is directed to utilizing a heat transfer system containing elongated sealed metal heat transferring heat pipes incorporated in the tire mold for transmitting heat to the mold surfaces. In accordance with this system, the heat is transmitted directly from the heat source such as a platen or a steam dome to the tread area of the mold. With a platen-heated mold, the heat pipes are positioned in the tread mold segments so as to transmit the heat from the platen directly to positions adjacent the tread forming surfaces of the mold. With the steam dome tire presses, the heat is transmitted by heat pipes directly from the steam dome to the heating positions adjacent the tread and sidewall forming surfaces of the mold.

In accordance with one aspect of the invention, there is provided a generally cylindrical tire mold having a radially inner tread forming surface, characterized by tubes extending from openings in the mold to heating positions adjacent the tread forming surface and heat pipe means positioned in the tubes for selectively transferring heat to the tire mold at the heating positions.

In accordance with another aspect of this invention there is provided a tire mold an upper cylindrical mold half and a lower cylindrical mold half with each mold half having a cylindrical groove spaced from the tread forming surface, the heat pipe means comprising a coiled heat pipe disposed in the groove and the tubes being formed in the groove by heat conducting material filling the voids around the heat pipe.

BRIEF DESCRIPTION OF THE DRAWINGS

FIG. 1 is a schematic cross sectional view of a tire mold embodying the invention mounted in a tire press having a heating platen with parts being broken away showing two heat pipes in position for transferring heat to the tread forming surface.

FIG. 2 is a bottom view of one of the segments of the tire mold shown in FIG. 1.

DESCRIPTION OF THE INVENTION

Figure 4:
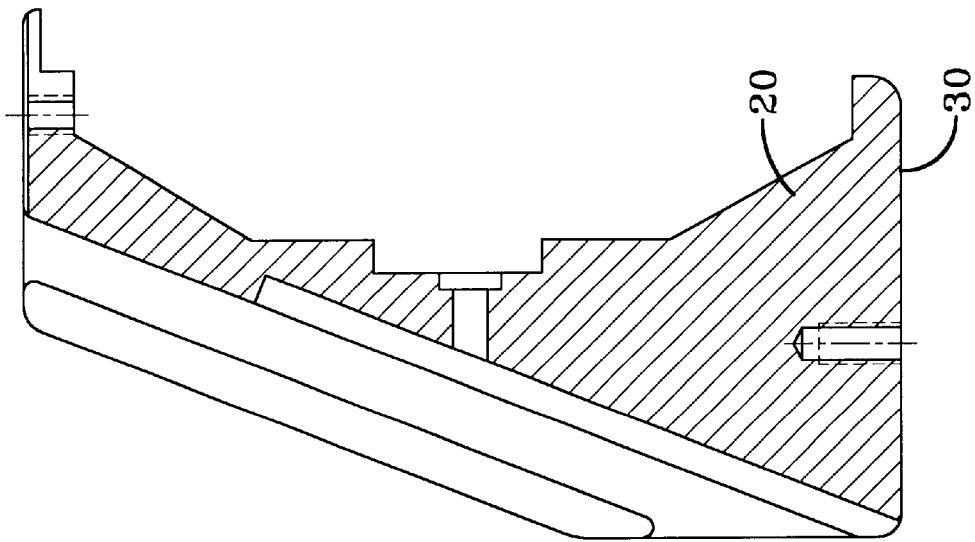
FIG. 4 is a sectional view like FIG. 1 taken along the plane of line 4—4 in FIG. 2.

Referring to FIG. 1, a schematic view of a portion of a tire press 10 embodying the invention is shown with an upper press platen 12 and a lower press platen 14 mounted for a relative vertical movement in a manner well known in the art. Mounted on the upper press platen 12 is the upper mold section 16 which includes a full circle mold back 18 and a plurality of radially movable mold segments 20 in sliding engagement with the mold back. Mounted on the mold segments 20 are radially inner tread mold segments 21 having radially inner tread forming surfaces 22. An upper sidewall surface 24 is provided on the upper mold section 16 and a lower sidewall surface 26 is provided on a lower mold section 28 which is in abutting relation with the lower platen 14 for heating the lower mold section. Also in abutting relation with the lower mold section 28 and platen 14 are the mold segments 20 slidably movable in a radial direction on a heat-conducting surface 30 as shown in FIGS. 1–4. This heat conducting surface 30 is in engagement with a heated surface 32 of the heated platen 14 shown in FIG. 1.

Figure 3:
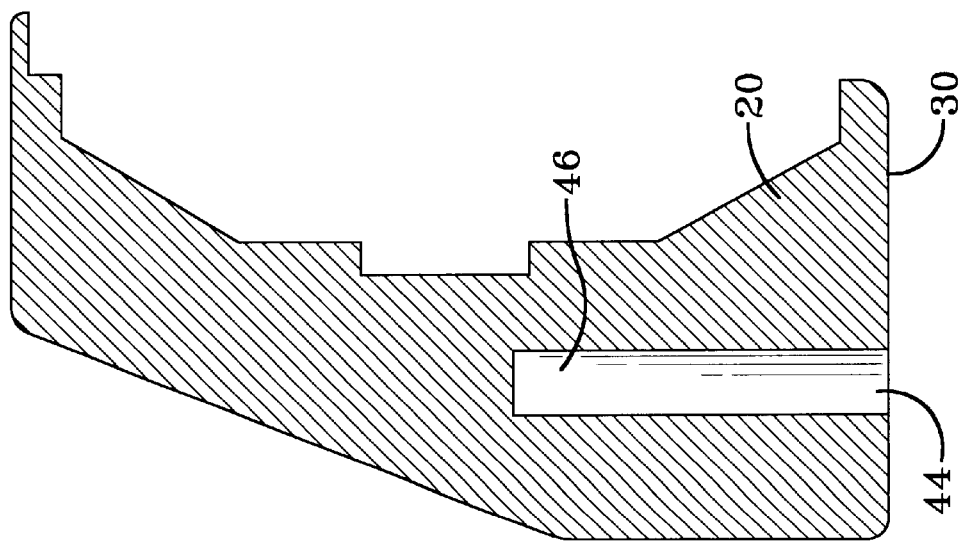
FIG. 3 is a sectional view like FIG. 1 of the segment shown in FIGS. 1 and 2 taken along the plane of line 3—3 in FIG. 2.
Figure 5:
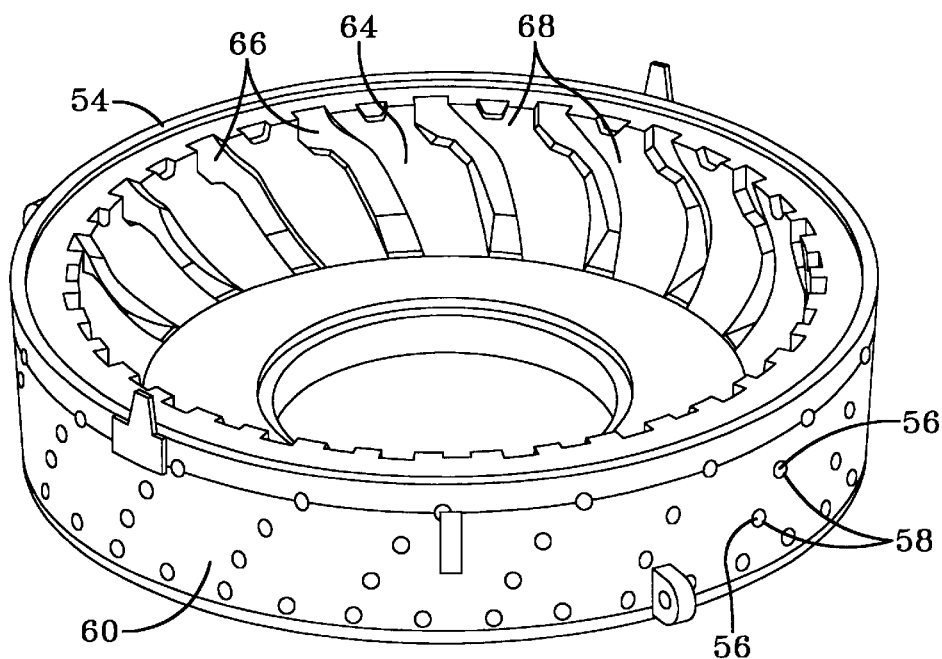
FIG. 5 is a view in perspective of another tire mold half embodying the invention showing the ends of the heat pipes exposed to the steam in a steam dome press.

The sectional view of the mold segment 20 in FIG. 1 is taken along lines 1—1 in FIG. 2 and illustrates the positions of the radially inner tubes 34 and the radially outer tubes 36 extending vertically through each of the segments 20 and having openings 38 and 40 facing the heat conducting surface 30 of the mold segment 20. Additional side tubes 42 and 44 may be provided at the sides of the segments 20 and extend partway into the mold segments as shown in FIG. 3. The center of each of the segments 20 is provided with grooves for sliding engagement with the upper mold section 16.

Inserted in each of the tubes 34, 36, 42 and 44 are heat pipes 46 extending from the heat conducting surface 30 of the lower mold section 28 to tread heating positions 48. Each of the heat pipes 46 may be of a type embodying an elongated, sealed metal heat transferring container for a liquid working fluid having a liner of wick material and an open core extending from a first end of the container to the second end of the container wherein the working fluid may be vaporized at the first end and the vapor transferred to the second end where it is condensed and then returned to the first end by capillary action through the liner. The second end of the container may include a substantial length of the container where heat transfer takes place due to the temperature differential between that portion of the container and the mold portion to be heated.

In the embodiment shown in FIGS. 1–4, the first sidewall surface 24 and lower sidewall surface of the mold are heated by the upper platen 12 and lower platen 14. The radially inner tread forming surfaces 22 are heated by the transfer of heat from the heated surface 32 of the lower press platen 14 which is in contact with the heat conducting surface 30 of the mold segments 20 and in contact with the heated ends of the heat pipes 46 in the side tubes 42 and 44 and the central tubes 50 and 52 located in the inner tubes 34 and outer tubes 36 of the mold segments. As shown in FIGS. 1 and 2, the heat pipes 50 in the radially inner tubes 34 are longer than the heat pipes 52 in the outer tubes 36 for transmitting heat to the outer extremities of the mold segment 20.

In operation, when the upper press platen 12 and the lower press platen 14 are heated, the upper sidewall surface 24 and lower sidewall surface 26 are heated by conduction. The tread forming surfaces of the mold segments 20 are heated by conduction from the heated surfaces of the upper press platen 12 and the lower platen 14. This is supplemented by the heat transmitted through the heat pipes 46 in contact with the heated surface 32 of the lower mold section 28. It has been found that with the supplementary heating by the heat pipes 46, there is substantial reduction in heating time for curing tires and also the temperature recovery time following loading and unloading is substantially improved.

Figure 6:
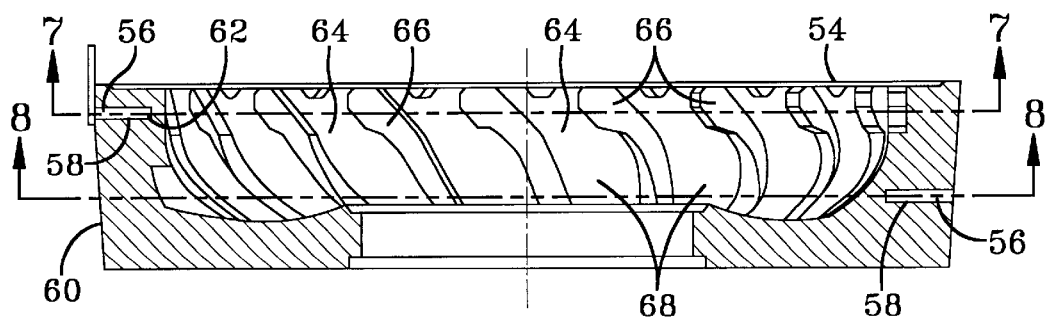
FIG. 6 is a cross sectional view of the mold half shown in FIG. 5.
Figure 7:
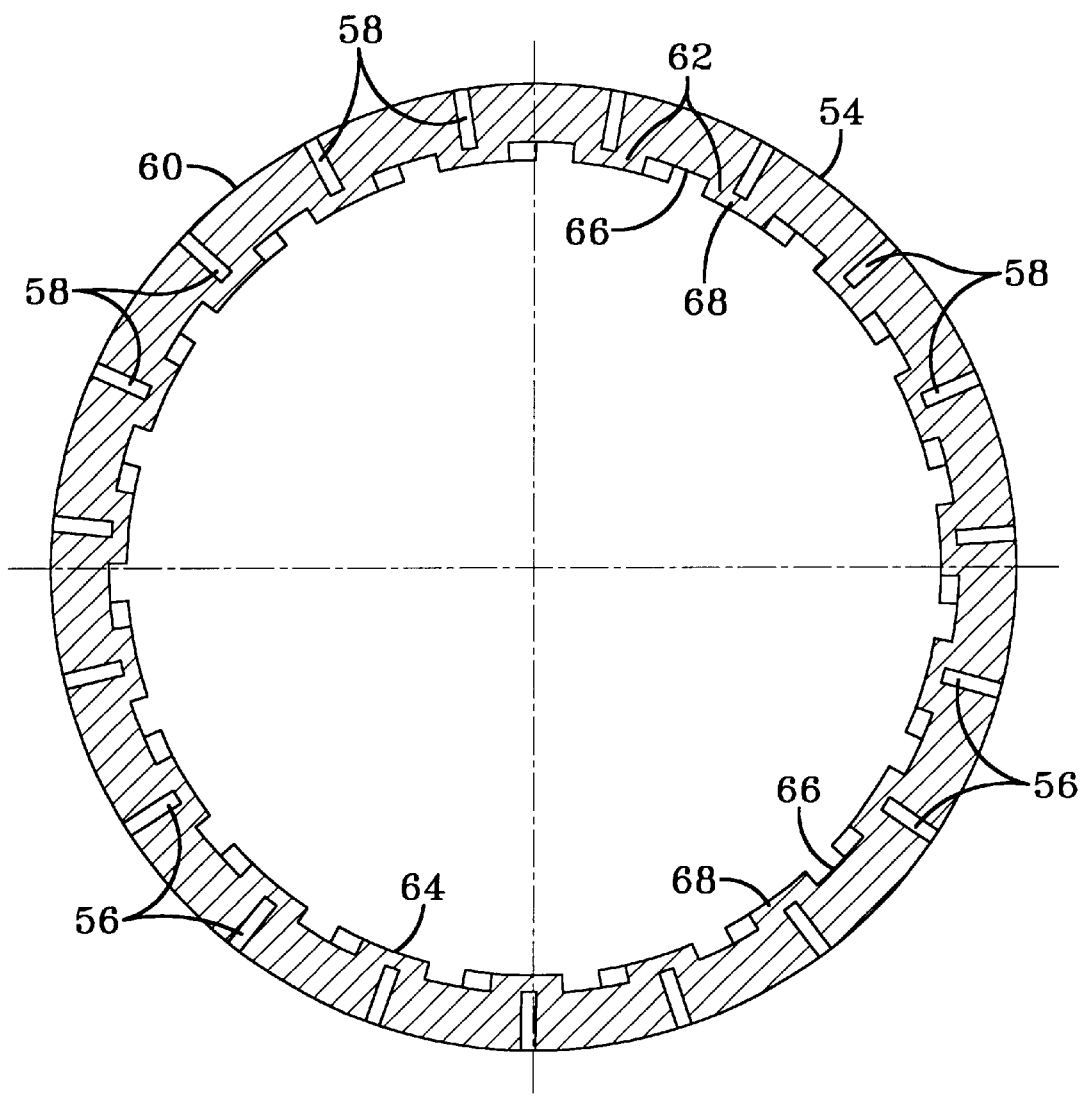
FIGS. 7 and 8 are sectional views of the mold half shown in FIG. 6 taken along the plane of line 7—7 and 8—8.
Figure 8:
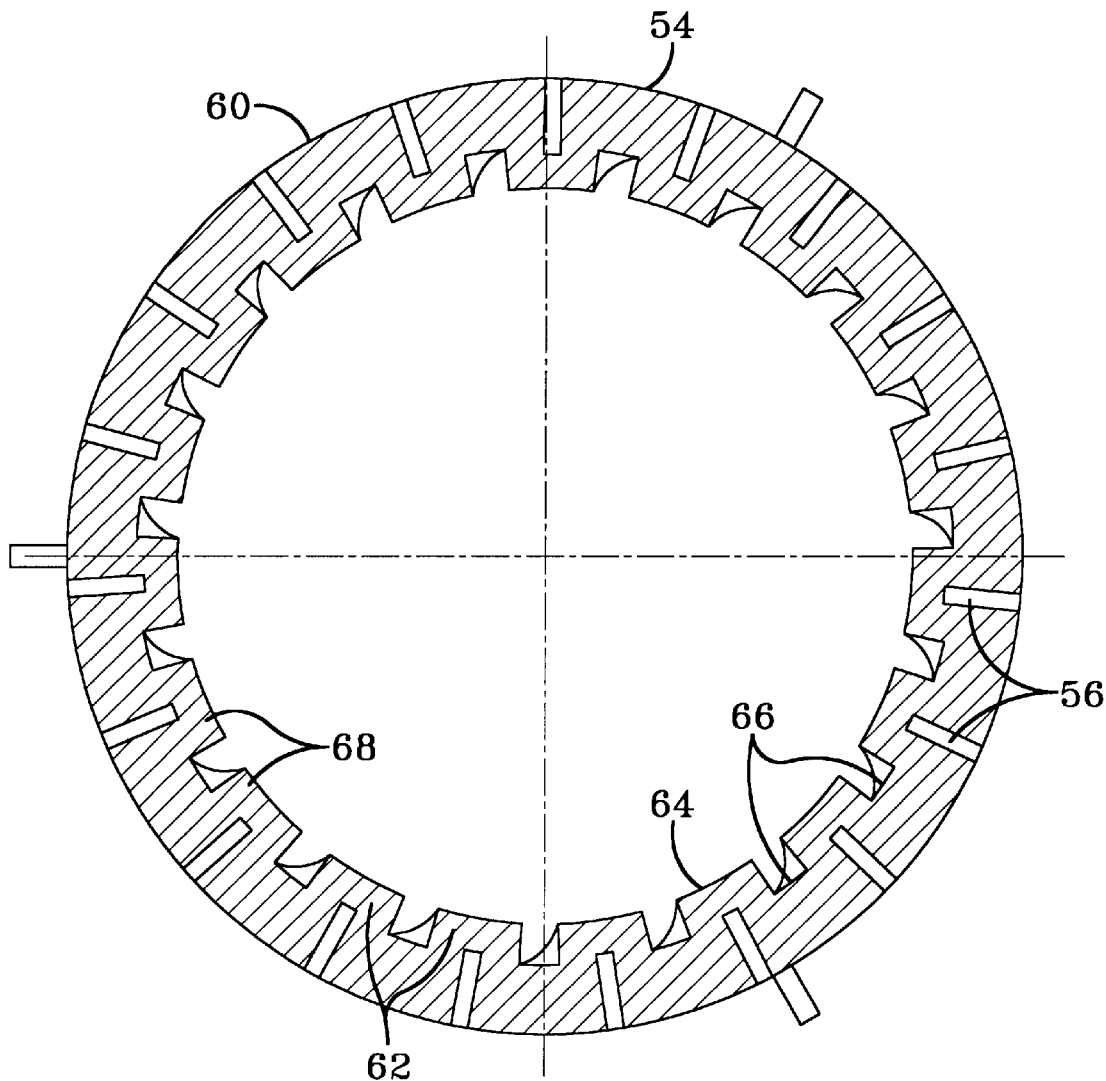

With reference to FIGS. 5, 6, 7, and 8, a mold half 54 of a steam dome press is shown with heat pipes 56 in tubes 58 extending from a radially outer surface 60 to heating positions 62 in the proximity of the tread forming surfaces 64. In the embodiment shown the mold has grooves 66 and ribs 68 for forming the tread. The tubes 58 are positioned so as to extend into the ribs 68 for transmitting heat through the heat pipes 66 from the radially outer surface 60 of the mold half which is exposed to the steam in the steam dome to the tread forming surface 64. As shown in FIGS. 6,7, and 8, the tubes 58 are also positioned at spaced apart positions axially of the mold half 54 for transmitting heat through the heat pipes 56 to different positions axially of the mold half.

Figure 9:
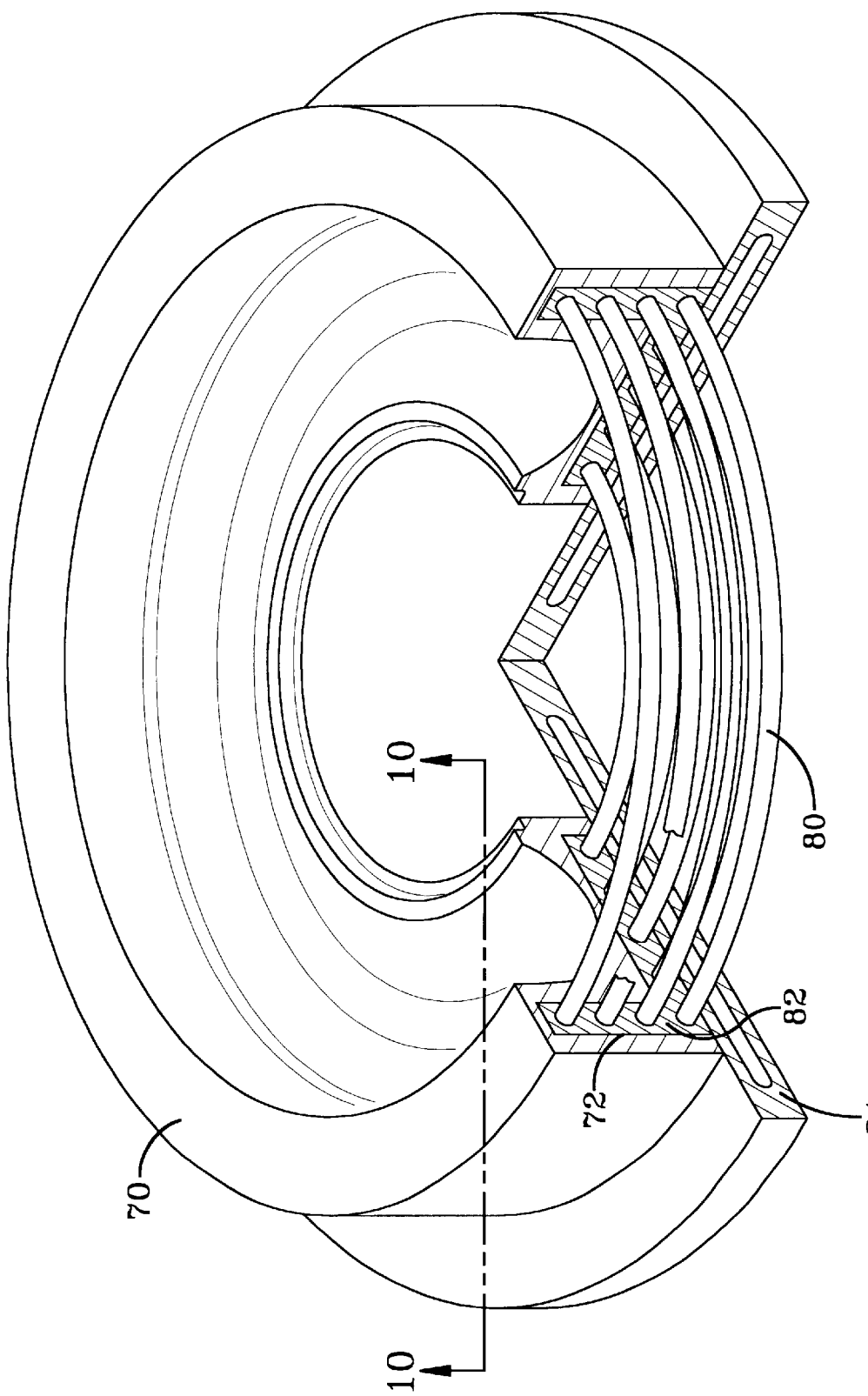
FIG. 9 is a view in perspective of another embodiment of the invention wherein the heat pipe is coiled and positioned in a circumferential groove for transferring heat from the platen to the tread forming surfaces showing the coiled heat pipe.
Figure 10:
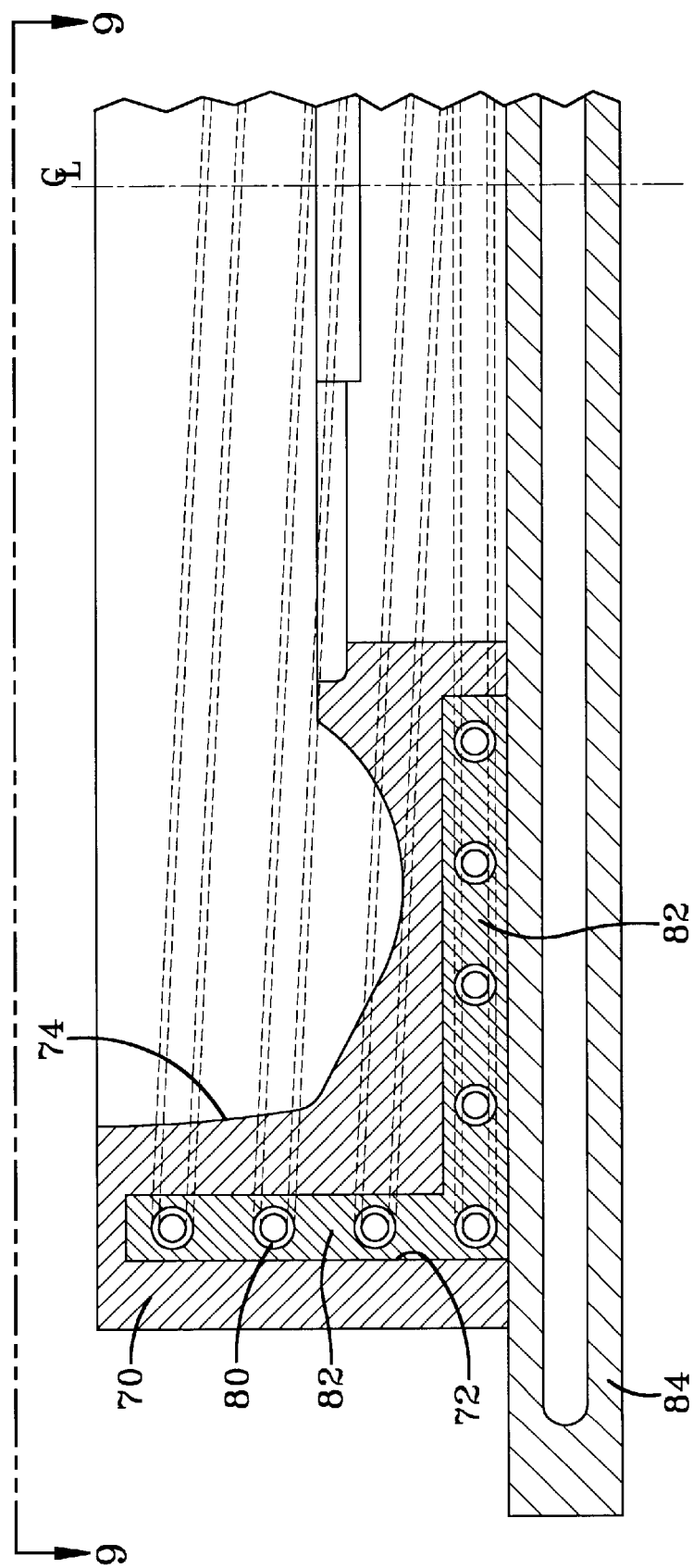
FIG. 10 is a fragmentary sectional view of a tire mold half with the coiled heat pipe of FIG. 9 embedded in the circumferential groove of the mold half and showing the platen for heating the coiled at the end of the pipes.

Referring to FIGS. 9, and 10 a sectional view of a platen heated mold half 70 is shown having a circumferential groove 72 extending axially in close proximity to the tread forming surface 74. The groove 72 may also have a radially inner extension 76 in close proximity to the sidewall 78. A coiled heat pipe 80. shown in FIG. 9 is positioned in the circumferential groove 72 and extension 76 with voids 82 filled with a thermally conductive solder or past to provide tubes for supporting the coils and conducting the heat to the mold. A heating platen 84 is positioned adjacent the mold half 70 and the bottom coils of the heat pipe 80.

In operation the coiled heat pipe 80 is heated by the platen 84 and heat transmitted through the coiled heat pipe to the tread forming surface 74 of the mold half 70.

A similar construction for an upper mold half and upper platen with a coiled upper heat pipe may be provided for the upper half of the tire mold. The heat pipe 80 in the lower mold half and upper mold half then approach one another in terms of heat transport capacity. Each has a slight slope along its length with the upper pipe working against gravity and the lower pipe 80 working with gravity. This can be compensated by using different pitch windings for the upper and lower mold halves. This arrangement produces a favorable uniformity about the mold axial centerline with all pipes on a properly sized heat pipe surface being within a few degrees of temperature of one another. With a single spiral wound heat pipe per mold half, the number of components is minimized and the probability of failure is reduced.

While certain representative embodiments and details have been shown for the purpose of illustrating the invention, it will be apparent to those skilled in the art that various changes may be made therein without departing from the spirit or scope of the invention.

What is claimed is:

1. A cylindrical tire mold having a radially inner tread forming surface, characterized by tubes extending from openings in said mold to heating positions adjacent said tread forming surface, heat pipe means positioned in said tubes for selectively transferring heat to said tire mold at said heating positions and each said heat pipe means comprising an elongated heat transfer container containing a working fluid transmitted from an evaporation end of said container at each of said openings to a condensation end at each of said heating positions.

2. A tire mold in accordance with claim 1 including a heating platen with a supporting surface, a plurality of radially movable tread mold segments slidably supported on said supporting surface for radial movement between an open position for loading and unloading a tire and a closed position for curing said tire characterized by each of said segments having said tubes containing said heat pipe means extending from said openings in said supporting surface to said heating positions spaced from said openings.

3. The tire mold according to claim 2 further characterized by said tubes including radially outer tubes and radially inner tubes with said radially outer tubes and said heat pipe means being shorter than said radially inner tubes and said heat pipe means to selectively heat said tire mold at heating positions spaced from said platen.

4. The tire mold of claim 3 further characterized by said tubes being located at radially and circumferentially spaced positions in each of said segments with said heating positions located adjacent an upper portion of each of said segments and with the lower portion of each of said segments being heated directly by said platen.

5. The tire mold in accordance with claim 1 including a lower cylindrical mold half having a tread forming surface characterized by said tubes and heat pipe means extending radially from a radially outer surface of said cylindrical mold half to said heating positions adjacent said tread forming surface.

6. The tire mold of claim 5 wherein said tread forming surface has ribs and grooves characterized by said tubes and heat pipe means extending into said heating position in said ribs.

7. The tire mold of claim 5 wherein each said cylindrical mold half has a side wall forming surface characterized by said tubes and said heat pipes extending radially from a radially outer surface of said cylindrical mold half to said heating positions adjacent said sidewall forming surfaces.

8. The tire mold of claim 1 including an upper cylindrical mold half and a lower cylindrical mold half with each said mold half having a cylindrical groove spaced from said tread forming surface, said heat pipe means comprising a coiled heat pipe providing voids in said groove and said tubes being formed in said groove by heat conducting material filling said voids around said heat pipe.

9. The tire mold of claim 8 farther characterized by said coiled heat pipe and said groove extending radially inward to said heating positions adjacent to sidewall forming surfaces of said upper cylindrical mold half and said lower mold half.

\* \* \* \* \*